(No Model.) 2 Sheets—Sheet 2.
E. E. WHIPPLE.
SUPPLEMENTAL TIRE.
No. 537,794. Patented Apr. 16, 1895.
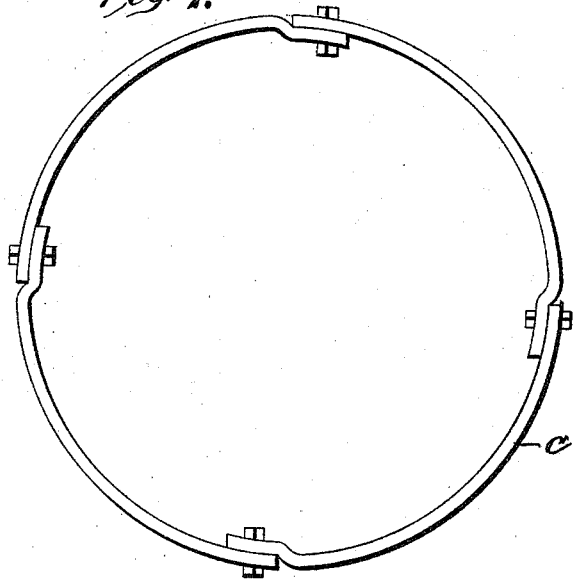
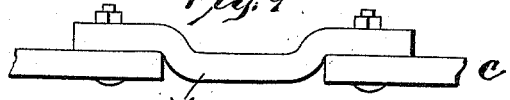
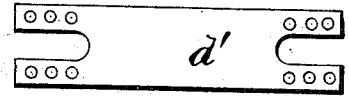
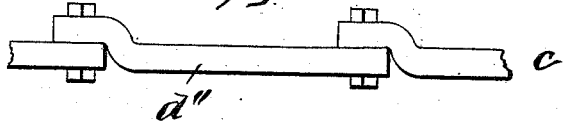
Witnesses
E. C. Duffy
C. M. Werle
Inventor
E. E. Whipple
per O. E. Duffy
Attorney

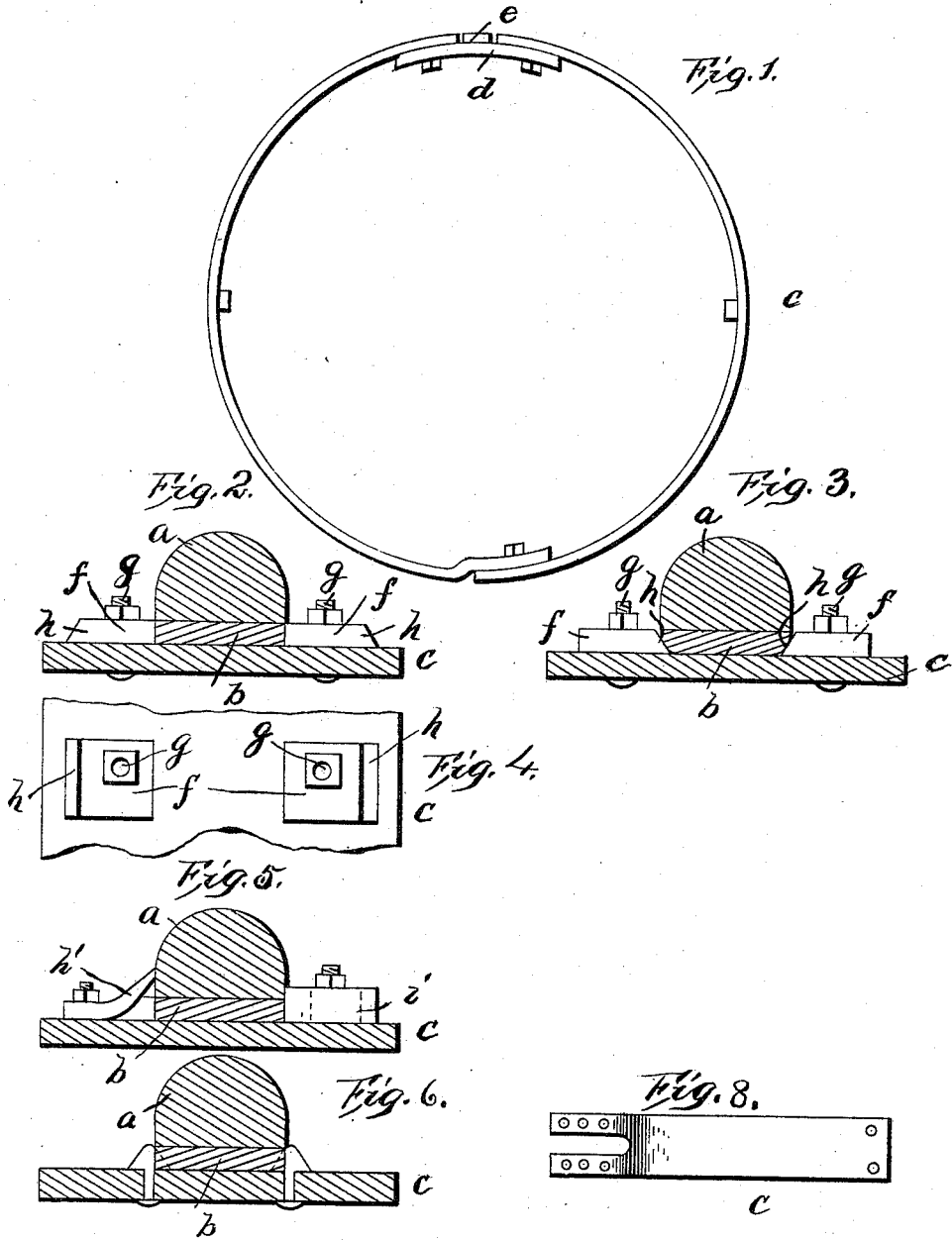

UNITED STATES PATENT OFFICE.

EFFINGER E. WHIPPLE, OF ST. JOHN'S, MICHIGAN.

SUPPLEMENTAL TIRE.

SPECIFICATION forming part of Letters Patent No. 537,794, dated April 16, 1895.

Application filed September 20, 1894. Serial No. 523,595. (No model.)

*To all whom it may concern:*

Be it known that I, EFFINGER E. WHIPPLE, of St. John's, in the county of Clinton and State of Michigan, have invented certain new and useful Improvements in Supplemental Tires; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in supplemental wide tires for vehicle wheels.

It is very expensive for farmers and others to keep two sets of wagons with the ordinary narrow tire for hard roads and with very wide tires for use on soft land, such as fields, &c., or when the roads are very muddy as in wet weather or in early spring.

To adapt the ordinary narrow tire vehicle wheels for use on soft ground, very wide removable supplemental tires have been provided which can be easily clamped around the ordinary vehicle wheel or can be removed therefrom when necessary.

The ordinary wagon wheels vary in diameter and width of tire; also the fact that the narrow wheel tires wear round or convex in cross section presents certain difficulties which have to be taken into consideration in supplying wide supplemental tires applicable to all classes of wagon wheels.

The object of this invention is to provide an improved wide supplemental tire exceedingly easy of adjustment to all kinds of wagon wheels, within varied limits as to diameter of wheel and width of fixed wheel tires.

A further object of the invention is to provide certain improvements in wide supplemental tires whereby a highly efficient wide tire is produced and one that can be easily packed in a small and convenient shape for transportation.

The invention consists in certain novel features of construction and in combinations of parts more fully and particularly described hereinafter and pointed out in the claims.

Referring to the accompanying drawings:—

Figure 1 is an edge elevation of the tire embodying principles of this invention. Fig. 2 is a cross sectional view through a wagon wheel and a supplemental tire thereof. Fig. 3 is a similar view showing the same with the narrow wagon wheel tire worn round at the edges, the adjustable stops of the supplemental tire being adjusted to receive the same. Fig. 4 is a plan view of the inner surface of the supplemental tire showing the construction of stop used in Figs. 2 and 3. Fig. 5 is a cross sectional view showing different means for holding the supplemental tire against lateral movement on the wheel. Fig. 6 is a view similar to Fig. 5, but showing a different construction of holding lug. Fig. 7 shows in edge elevation a supplemental tire formed of a number of sections. Fig. 8 is a plan view of one of the sections employed in the construction of Fig. 7. Fig. 9 shows the manner of uniting the sections of the tire and at the same time forming the fillet between the ends of the tire section. Fig. 10 is a plan view of the fastening of Fig. 9. Fig. 11 is a detail edge view showing a different form of fastening and fillet.

In the drawings *a*, is a felly, and *b*, the narrow tire of an ordinary wheel.

*c*, is a wide removable tire arranged to be removably confined on a wagon wheel and of considerably greater width than the wagon wheel tire. This wide tire can be formed of flat metal, substantially as shown. This wide tire is formed of one or more sections and provided with coupling means so that it can be expanded and slipped on the wheel and then contracted and tightly clamped thereon. In Fig. 1, this wide tire is shown formed in two sections. At one juncture between these sections the end of one section is depressed inwardly a distance equal to the thickness of the wide tire so that the end of the opposite sections can overlap and rest on said depressed portion, the depressed portion being forked as shown in Fig. 10, so as to straddle the permanent wheel tire, series of bolt holes being provided in said depressed portions on opposite sides of the wheel, and bolt holes being provided in the end of the opposite sections so that the two sections can be united by bolts. Any suitable means, can be provided for adjustably clamping together the opposite ends of the sections, as coupling plates $d$, bolted to the inner face of the tire section and arranged on opposite sides of the permanent wheel tire. These coupling means $d$, can carry the fillet $e$, to fill the space between the ends of the tire sections if the wheel is of such diameter as to prevent the ends of the tire section being drawn together. This fillet can be of any suitable form or construction, as shown in Fig. 1, consisting of a rectangular block bolted to the coupling plates, $d$, and extending transversely across the same between the ends of the tire.

In Figs. 9 and 10, I show a coupling plate $d'$, of the same width as the wide tire and arranged to form a fillet and rest on the outer face of the permanent wheel tire, and having its ends bent inwardly and longitudinally slotted as shown in Fig. 10, so as to extend on opposite sides of the permanent wheel tire and within the ends of the tire sections so that the tire sections can be bolted to the inner ends of this coupling plate; also in Fig. 11, I show a coupling plate $d''$, forming the fillet and at one end having the inwardly bent and slotted end to extend along the inner surface of one of the tire sections and cut off square at the opposite end, the end of the opposite tire section being bent in so as to fit the inner surface of said coupling and fillet plate $d''$ and slotted to embrace the permanent wheel tire, and the parts being bolted together in the same manner.

A suitable tightener (not shown) is employed to draw the ends of the tire sections together before they are secured by the coupling plates.

In Fig. 7, I show a wide tire composed of the plurality of sections, four sections being shown, the sections being all alike and each having one straight end and one slotted or forked end bent inwardly as just described in connection with Fig. 1, to embrace the permanent wheel tire and to permit overlapping of the straight end of the next adjacent section, so that the outer surface of the tread of the wide tire will be practically smooth and unbroken. In this construction the coupling plates or devices are not employed, but all of the sections are coupled directly together by bolts passed through the series of holes in the forked and straight ends.

In placing the tire on a wheel, the sections all are coupled together except at one joint. The tire is then placed on the wagon wheel and a removable tightener is employed to draw the tire tightly around the wagon wheel so that when the joint is complete the removable tire will be rigid on the wheel. The ends of the sections at this joint can be provided with apertures to receive the movable tightening device. By thus forming the wide tire in like sections transportation rates will be greatly reduced as the tire can be uncoupled and knocked down and the sections fitted one within the other and the tire shipped at the same rate as bar iron. Furthermore by having inwardly bulged slotted ends the tire is firmly held on and firmly embraces the permanent wheel tire so as to prevent lateral play on the permanent wheel tire.

In order to prevent lateral play of the wide tire on the wheel it is usually necessary to provide inwardly projecting lugs on the inner surface of the wide tire to fit the opposite edges of the permanent wheel tire. Heretofore these lugs have been formed rigidly and at fixed intervals by punching in the metal of the wide tire, or by rivets rigidly affixed in various manners to the wide tire. However the widths of the permanent wheel tires vary and also the permanent wheel tires sometimes vary in thickness from the center of the tread to the edges. Hence it is difficult, where the wide tires are made to certain standards and furnished to wagon owners, to get wide tires that will fit the wheels. To avoid this difficulty, I have provided a wide removable tire with adjustable holding lugs so that the lugs can always be adjusted to tightly engage the permanent wheel tire, the object being to provide a wide removable tire that can fit any wagon wheel within reasonable bounds. In Figs. 2 and 6, inclusive various devices are shown for accomplishing this purpose.

In Figs. 2, 3, and 4, I show the lugs formed by blocks $f$, loosely and eccentrically pivoted on the inner surface of the wide tire by suitable pivots, such as $g$, and having the straight edges arranged different distances from the pivot so that by turning a block a greater or less space will be left between the inner edges of the opposite lugs. It will be observed that when the straight edges of the lugs fit against the edges of the permanent wheel tire it will be impossible for the lugs to rotate.

In order to cause permanent wheel tires that have been worn around to more snugly fit the wide tire one or more edges $h$, of the holding lugs can be beveled from the surface of the wide tire inwardly so that when said beveled edge is turned against the permanent wheel tire it will extend over the worn off edges of the permanent wheel tire and thus fill in the spaces between the said edges and the inner surface of the removable tire; thereby obviating certain objections heretofore found to exist when the wide tires are employed with worn permanent tires.

In Fig. 6, turnable rivets or blocks are shown straight on one edge and having lateral beveled heads on the opposite edge so that by turning these pivots the spaces between them can be varied in size.

In Fig. 5, a spring arm $h'$, is shown secured at one end of the inner surface of the wide tire and projecting inwardly so that its free end will yieldingly engage one edge of the wheel, a slide or turn block $i$, being arranged on the opposite side of the wide tire to engage the opposite edge of the wheel and hold the wheel against the spring $h'$. This block $i$, can be adjustably held in position by the bolt and nut and if desired serrations can be provided to prevent the nut loosening.

It is evident that various changes might be made in the forms, arrangements and constructions of the parts described without departing from the spirit and scope of my invention. Hence I do not wish to limit myself to the exact construction herein set forth, but consider myself entitled to all such changes as fall within the spirit and scope of my invention.

Having thus fully described my invention, what I claim as new, and desire to secure by Letters Patent of the United States, is—

1. A wide supplemental tire having the turnable lugs on its inner surface with their straight edges arranged at different distances from the turning point.

2. A wide supplemental tire having holding lugs provided with beveled edges for the purpose set forth.

3. A wide supplemental tire having the eccentric turnable stops.

4. A wide supplemental removable tire for vehicle wheel tires, formed of sections, one end of a section depressed and slotted longitudinally so that the two ends thus formed are arranged at opposite edges of the permanent tire, the adjoining straight end of the adjoining section resting on said two ends and bolted thereto, whereby the tire can be knocked down and the sections thereof nested, substantially as described.

5. A wide removable supplemental tire having the coupling plate bulged out between its ends to rest on the permanent tire and form a fillet between the supplemental tire ends and having its ends bent in to fit beneath and be bolted to the supplemental tire ends and slotted to straddle the permanent tire, substantially as described.

6. A wide supplemental tire having the adjustable holding lugs arranged on opposite sides of the center thereof, each lug having a beveled engaging face for the purpose set forth.

7. A wide supplemental tire having movable blocks on its inner surface to one side of the center thereof, and provided with holding edges movable toward and from and arranged to engage the edge of the permanent tire.

In testimony that I claim the foregoing as my own I affix my signature in presence of two witnesses.

EFFINGER E. WHIPPLE.

Witnesses:
HANNAH M. WHIPPLE,
M. MAUD WHIPPLE.